United States Patent
Ezerzere et al.

(10) Patent No.: US 8,682,507 B2
(45) Date of Patent: Mar. 25, 2014

(54) METHOD AND SYSTEM FOR DETERMINING FLIGHT PARAMETERS OF AN AIRCRAFT

(75) Inventors: Pierre Ezerzere, Bouloc (FR); Cedric Seren, Frouzins (FR); Georges Hardier, Balma (FR)

(73) Assignees: Airbus Operations SAS, Toulouse (FR); Onera (Office National d'etudes et de Recherches Aerospatiales), Chatillon (FR)

( * ) Notice: Subject to any disclaimer, the term of this patent is extended or adjusted under 35 U.S.C. 154(b) by 0 days.

(21) Appl. No.: 13/563,357

(22) Filed: Jul. 31, 2012

(65) Prior Publication Data

US 2013/0035809 A1 Feb. 7, 2013

(30) Foreign Application Priority Data

Aug. 1, 2011 (FR) ...................................... 11 02405

(51) Int. Cl.
*G06F 7/00* (2006.01)
(52) U.S. Cl.
USPC .............. 701/7; 701/2; 701/3; 701/4; 701/13; 701/14; 342/62; 342/63; 342/64; 342/75; 342/195; 340/965
(58) Field of Classification Search
USPC ........... 701/2, 3, 4, 7, 13, 14, 32.9, 34.4, 100, 701/446, 469, 472, 479, 480, 505, 509, 510, 701/514, 536; 342/62, 63, 64, 75, 195, 342/357.32; 244/3.1, 3.15, 164, 171; 702/33, 185, 190; 340/965; 706/16, 45; 235/412
See application file for complete search history.

(56) References Cited

U.S. PATENT DOCUMENTS

| | | | |
|---|---|---|---|
| 5,058,836 A | 10/1991 | Nobel | |
| 6,456,906 B1 | 9/2002 | Hua | |
| 6,868,315 B2 * | 3/2005 | Hellio et al. | 701/4 |
| 8,447,444 B2 * | 5/2013 | Ezerzere et al. | 701/9 |
| 8,447,446 B2 * | 5/2013 | Puig et al. | 701/14 |
| 2003/0135307 A1 * | 7/2003 | Hellio et al. | 701/4 |
| 2010/0292872 A1 * | 11/2010 | Ezerzere et al. | 701/9 |
| 2011/0046823 A1 * | 2/2011 | Ezerzere et al. | 701/4 |
| 2011/0071710 A1 * | 3/2011 | Puig et al. | 701/14 |

FOREIGN PATENT DOCUMENTS

CN 101839719 9/2010

OTHER PUBLICATIONS

French Office Action dated Mar. 28, 2012.

* cited by examiner

*Primary Examiner* — McDieunel Marc
(74) *Attorney, Agent, or Firm* — Dickinson Wright PLLC

(57) ABSTRACT

Disclosed are a method and system for improving real-time determination of flight parameters of an aircraft during flight. A selection module selects and delivers measured values of input parameters to an estimation unit, and the estimation unit uses the input parameters to estimate at least two selected flight parameters. The input parameters are received by the estimation unit on the basis of identified flight mechanics equations associated with the selected flight parameters. The estimation unit includes an extended Kalman filter, which is configured to receive the values of the input parameters and to output joint estimations of the selected flight parameters based on the flight mechanics equations, during the flight of the aircraft.

11 Claims, 2 Drawing Sheets

METHOD AND SYSTEM FOR DETERMINING FLIGHT PARAMETERS OF AN AIRCRAFT

The present invention relates to a method and a system for the determination of flight parameters of an aircraft, during a flight of the latter.

BACKGROUND OF THE INVENTION

The introduction of electric flight controls and the greater level of automation of modern transport airplanes have made it possible to significantly improve their safety. This technological leap has allowed the formulation of more secure piloting laws—in particular implemented by the automatic pilot—which participate actively in the protection of airplanes, in particular during abnormal situations, faults with the flight systems, dangerous environmental conditions, etc.

However, the use of numerous piloting laws has increased the dependency of flight systems on the measurements of the parameters of the state of an airplane. In particular, certain flight parameters now turn out to be indispensable for ensuring the flight of an airplane, so that it becomes necessary to have reliable values of these parameters. The indispensable parameters include, in particular, the anemometric and inertial parameters, their processing being performed by the ADIRS system (the acronym standing for "Air Data and Inertial Reference System") which delivers information pertaining to the speed, the altitude and the inertial data (in particular the trim) of the airplane.

DESCRIPTION OF THE PRIOR ART

Currently, the values of the flight parameters are established on the basis of the measurements originating from suitably adapted sensors, so that the validity of these values depends essentially on the validity of the measurements performed by these sensors. However, in the case of external sensors, outside disturbances (for example icing or else the fouling of the sensors) may impair the precision and the correctness of the measurements performed by these external sensors.

Hence, in order to satisfy the regulatory and safety obligations imposed by air safety authorities, it is necessary to ensure the reliability, the precision and the availability of the values of the flight parameters.

Accordingly, one of the known solutions, implemented currently, relies on hardware redundancy: this entails amplifying the number of sensors and computers making it possible to obtain the value of a given flight parameter.

However, the detection of inconsistent and/or erroneous values of a given flight parameter may lead, in certain extreme cases, to not considering any of the values obtained by the sensors, so that no value associated with said flight parameter considered is then available. Such an absence of value can cause a change in the piloting laws used by the onboard flight systems.

This is why, in order to avoid the extreme cases of total absence of value of one or more parameters, it is known to estimate, with the aid of a Kalman filter, at least some of the indispensable flight parameters. For example, it is known that the angle of incidence may be estimated by means of a Kalman filter configured on the basis of flight mechanics equations defining the evolution of the angle of incidence in the course of a flight. To carry out such an estimation, the Kalman filter receives as input a measurement of the air speed (the angle of incidence being intimately related to the latter)—obtained by onboard sensors—and delivers, as output, an estimation of the angle of incidence.

However, when the measured value of the air speed is erroneous (for example on account of a fault with the sensors), the estimate of the angle of incidence turns out also to be defective. The estimation carried out by Kalman filtering of a unique flight parameter does not therefore make it possible to circumvent a disturbance in the measurement or measurements of the input parameters that is necessary for the estimation of the flight parameter considered, since, in such a case, the estimation obtained is also erroneous and therefore unusable.

The object of the present invention is to remedy these drawbacks and, in particular, to circumvent a defect of measurement of one or more of the input parameters of the Kalman filter, so as to guarantee the availability of a reliable value of the flight parameter considered at the output of the latter filter.

SUMMARY OF THE INVENTION

To this end, according to the invention, the method for improving the real-time determination of flight parameters of an aircraft, in the course of a flight of the latter, is noteworthy in that the following steps are performed:
- at least two flight parameters of said aircraft to be estimated are selected;
- the flight mechanics equations which are associated respectively with the selected flight parameters and for which there exists a dependency relationship between said selected flight parameters are identified;
- on the basis of said identified flight mechanics equations associated with said selected parameters, an extended Kalman filter is configured, which receives values of input parameters comprising at least said selected flight parameters; and
- during a flight of said aircraft, the extended Kalman filter is implemented so that it delivers, as output, joint estimations of said selected flight parameters.

Thus, by virtue of the invention, at least two flight parameters which are inter-related by way of specially identified flight mechanics equations are estimated simultaneously with the aid of the appropriately configured extended Kalman filter. An error in one or more values of the input parameters is thus circumvented. Indeed, an erroneous value of an input parameter of the extended Kalman filter, used during the estimation of a selected flight parameter, no longer necessarily causes erroneous estimation of the latter, since it is, by virtue of the invention, possible to reconstruct the estimation of said selected flight parameter on the basis, in particular, of the estimation of the other selected flight parameter, to which it is coupled through the intermediary of the flight mechanics equations identified.

Stated otherwise, the present invention provides a co-estimation of at least two previously selected flight parameters, inter-related by flight mechanics equations, even when one or more input values of the filter are erroneous. This guarantees the availability of the values of the selected flight parameters implemented in the aircraft piloting laws. The invention therefore makes it possible to provide a backup estimation of the selected flight parameters when the sensors of the airplane no longer make this possible in a conventional way.

Preferably, said Kalman filter being defined by the following matrices:
- the covariance matrix R related to the measurement noise and associated with the diagonal matrix of the measurement noise V; and the covariance matrix Q related to the evolution noise and associated with the diagonal matrix of the evolution noise W, the following additional steps are performed:

it is verified that the values of said input parameters are admissible; and in the case of detection of a defect of a value of an input parameter, the current value of at least one of the elements of at least one of the covariance matrices R and Q is adapted, in real time.

Thus, it is possible to modify the settings of the extended Kalman filter through an adaptation of the gains, so as to make allowance for faults (should outside phenomena affect the operation of the sensors embedded aboard the aircraft) in certain measurements—obtained by the onboard sensors—which affect the values of the input parameters. By adapting the values of the covariance matrices R and Q, more confidence is placed either in the measurements performed by the onboard sensors, or in the estimations of the extended Kalman filter.

Preferably:

in a preliminary step, a plurality of presettings of the covariance matrices R and Q related respectively to the measurement and evolution noise is defined, said presettings thus defined each being associated with a defective value of one of said input parameters; and to adapt the current value of said covariance matrices Q and R related to the measurement noise and evolution noise in the case of detection of a defect of the value of an input parameter, the predefined presetting, corresponding to the detected defective value, is assigned to the covariance matrices R and Q related to the measurement noise and evolution noise.

Furthermore, as a variant or as a supplement, in the case of detection of a defect of a value of one of said input parameters measured by one or more sensors embedded aboard said aircraft, said defective measured value is substituted by the estimated corresponding value delivered as output of said extended Kalman filter.

In this way, the defective measurements are no longer taken into account, by the extended Kalman filter, in estimating the selected flight parameters.

Moreover, it is advantageously possible to perform the following steps:

at least one of said selected flight parameters for which said Kalman filter delivers an estimation is considered;

from among the values of the input parameters of said Kalman filter are selected those corresponding to said flight parameter considered which originate from sensors embedded aboard said aircraft;

an inconsistency tied to at least one of said selected values is detected; and the current value of said flight parameter selected is determined on the basis of the remaining selected value or values and of the estimation of said selected flight parameter, while excluding the detected inconsistent value or values.

Thus, the determination of the current value of the selected flight parameters is obtained without reference to the inconsistent measured value or values. An item of information, namely the estimation of the selected flight parameter considered, is added so as to increase the availability of the current value of said parameter, even in the case of unavailability or of inconsistency of one or more corresponding measured values. Thus, the type of values allowing the determination of a selected flight parameter is diversified, so as to guarantee the delivery of a current value associated with said parameter. By ensuring the delivery of a current value of the selected flight parameters even in the case of a fault with all the associated sensors din this case it is possible to use the estimation provided by the extended Kalman filter), the risk of a change of the piloting laws involving the flight parameter considered is reduced. The availability of the so-called normal laws is therefore increased, thus ensuring continuity of the control performance of the aircraft.

Moreover, in an implementation of the method in accordance with the invention, the state vector associated with said extended Kalman filter is defined by the following twelve states:

the angle of incidence $\alpha$;

the speed in the terrestrial frame v;

the speed relative to the ground V;

the pitch rate q;

the attitude $\theta$;

the altitude h;

the net motive thrust $T_B$;

the bias $b_{nx}$ projected in the direction corresponding to the longitudinal acceleration nx;

the bias $b_{ny}$ projected in the direction corresponding to the lateral acceleration ny;

the wind speed $W_x$ along the x axis of the terrestrial frame (x,y,z);

the wind speed $W_y$ along the y axis of the terrestrial frame (x,y,z); and the wind speed $W_z$ along the z axis of the terrestrial frame (x,y,z).

Furthermore, according to this implementation, said input parameters of the extended Kalman filter comprise inertial parameters, anemometric parameters, parameters specific to said aircraft and intermediate parameters arising from onboard modelings.

Moreover, the present invention also relates to a system for determining, in real time, flight parameters of an aircraft, in the course of a flight of the latter, which comprises an extended Kalman filter able to receive values of input parameters and which is noteworthy:

in that said extended Kalman filter is configured on the basis of flight mechanics equations establishing a dependency relationship between at least two preselected flight parameters of said aircraft to be estimated belonging to said input parameters; and in that said extended Kalman filter is formed so as to deliver, during a flight of said aircraft, joint estimations of said selected flight parameters.

Preferably, said Kalman filter is defined by the following matrices:

the covariance matrix R related to the measurement noise and associated with the diagonal matrix of the measurement noise V; and the covariance matrix Q related to the evolution noise and associated with the diagonal matrix of the evolution noise W, and said system comprises:

means for verifying whether the values of said input parameters of the extended Kalman filter are admissible; and means for adapting in real time, in the case of detection, by said verification means, of a defect of a value of an input parameter, the current value of at least one of the covariance matrices R and Q.

Furthermore, said system comprises means for replacing the defective value or values by their value estimated by the extended Kalman filter, when they are available.

The present invention relates moreover to an aircraft which comprises at least one system such as described hereinabove.

BRIEF DESCRIPTION OF THE DRAWING

The figures of the appended drawing will elucidate the manner in which the invention may be embodied. In these figures, identical references designate similar elements.

DESCRIPTION OF THE PREFERRED EMBODIMENTS

Figure 1:
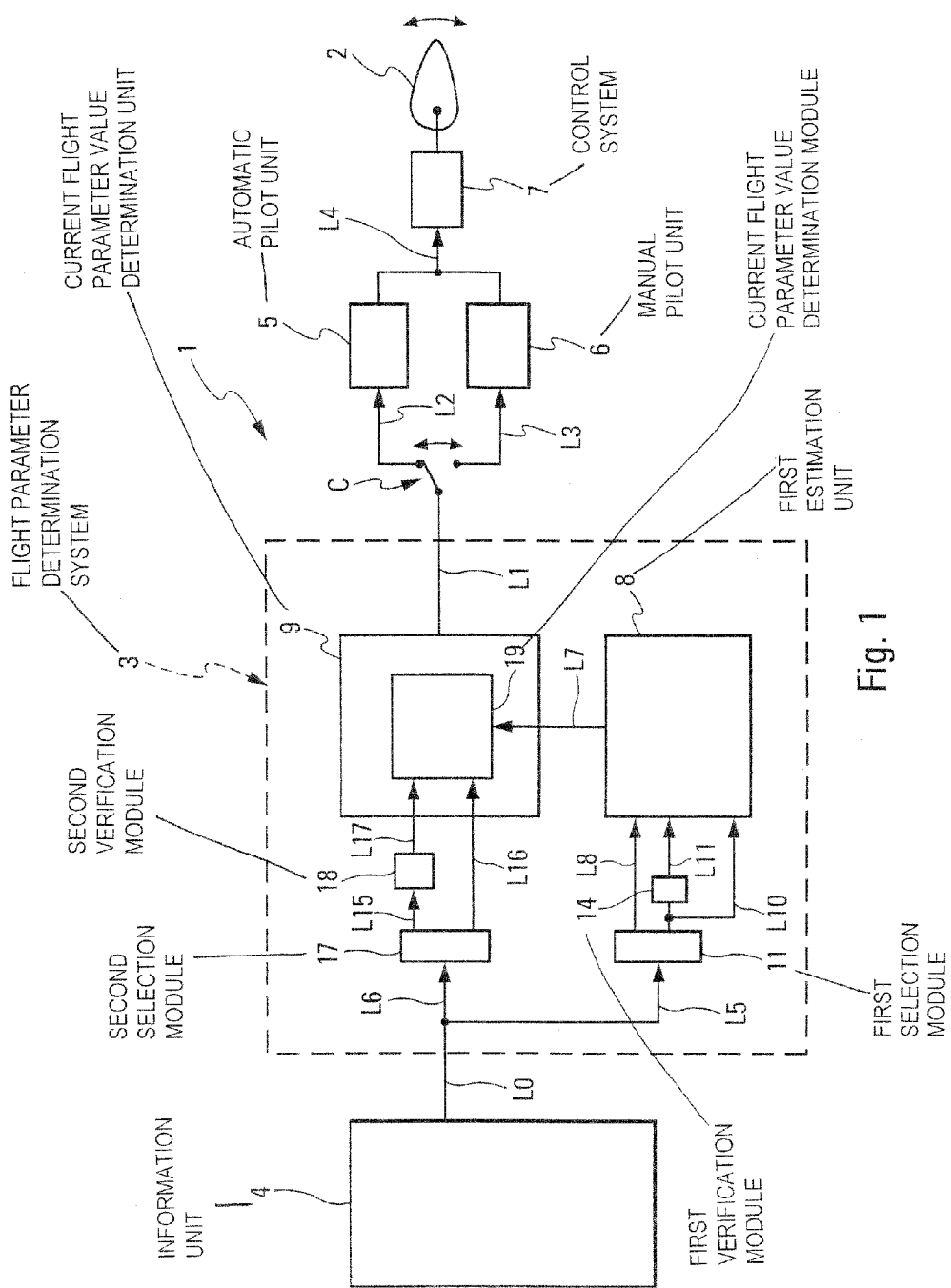
FIG. 1 is the schematic diagram of a control chain for an aerodynamic control surface of an aircraft, which chain implements a system for determining flight parameters in accordance with the present invention.

In FIG. 1 has been represented, in a schematic manner, a control chain 1 of an aerodynamic control surface 2 (for example an aileron) of an aircraft (not represented), in which chain is implemented a system 3 for determining, in real time, flight parameters of the aircraft involved in the actuation of the control surface 2.

As shown by this figure, the control chain 1 comprises:
an information unit 4, formed of a plurality of measurement sensors and of computers embedded aboard the aircraft, which is capable of delivering, in a standard manner, measured values of parameters of the aircraft (such as the angle of incidence, the angle of pitch, the angle of roll, the air speed, the altitude, etc.);
the system 3, detailed hereinafter, for the determination, in real time, of flight parameters, which receives, as input, the values measured by the information unit 4, by way of the link L0;
an automatic pilot 5 of the aircraft which implements numerous piloting laws for the management of the flight controls: depth, ailerons, direction, power delivered by the engines, etc. With each piloting law is associated a particular automatic piloting mode of the automatic pilot 5, so that the engagement of the automatic piloting modes causes the activation of the corresponding piloting laws. The automatic pilot 5 is able to receive values of flight parameters which have been determined by the determination system 3 and transmitted by way of switching means C, to which it is connected by the link L2. Furthermore, it is capable of delivering, as output, control commands destined for a control system 7 (comprising an actuator) for the control surface 2;
manual piloting means 6 comprising in particular piloting facilities (for example the stick) for controlling the aircraft in the course of a flight. They are able to receive flight parameter values which have been determined by the determination system 3 and transmitted by way of the switching means C, to which they are connected by the link L3. Furthermore, the manual piloting means 6 are able to deliver, as output, control commands destined for the control surface 2 control system 7;
the switching means C connected to the determination system 3, to the automatic pilot 5 and to the manual piloting means 6, respectively by the links L1, L2 and L3. The switching means C make it possible to toggle either to automatic piloting mode, or to manual piloting mode. They are able to transmit either to the automatic pilot 5, or to the manual piloting means 6, the flight parameter values which have been determined by the determination system 3; and the control system 7 for adjusting the positioning of the control surface 2. This control system 7 is able to receive, through the link L4, control commands originating from the automatic pilot 5 or manual piloting means 6 and to adjust, consequently, the inclination of the control surface 2.

According to the invention, the determination system 3 of the invention comprises:
a unit 8 for estimating previously selected flight parameters, the set of these selected flight parameters defining a measurement vector $Z(t)$; and
a unit 9 for determining the current value of flight parameters of the aircraft, which is able to receive the estimation $\hat{Z}(t)$ (the notation "^" designating an estimation) of the measurement vector $Z(t)$.

Figure 2:
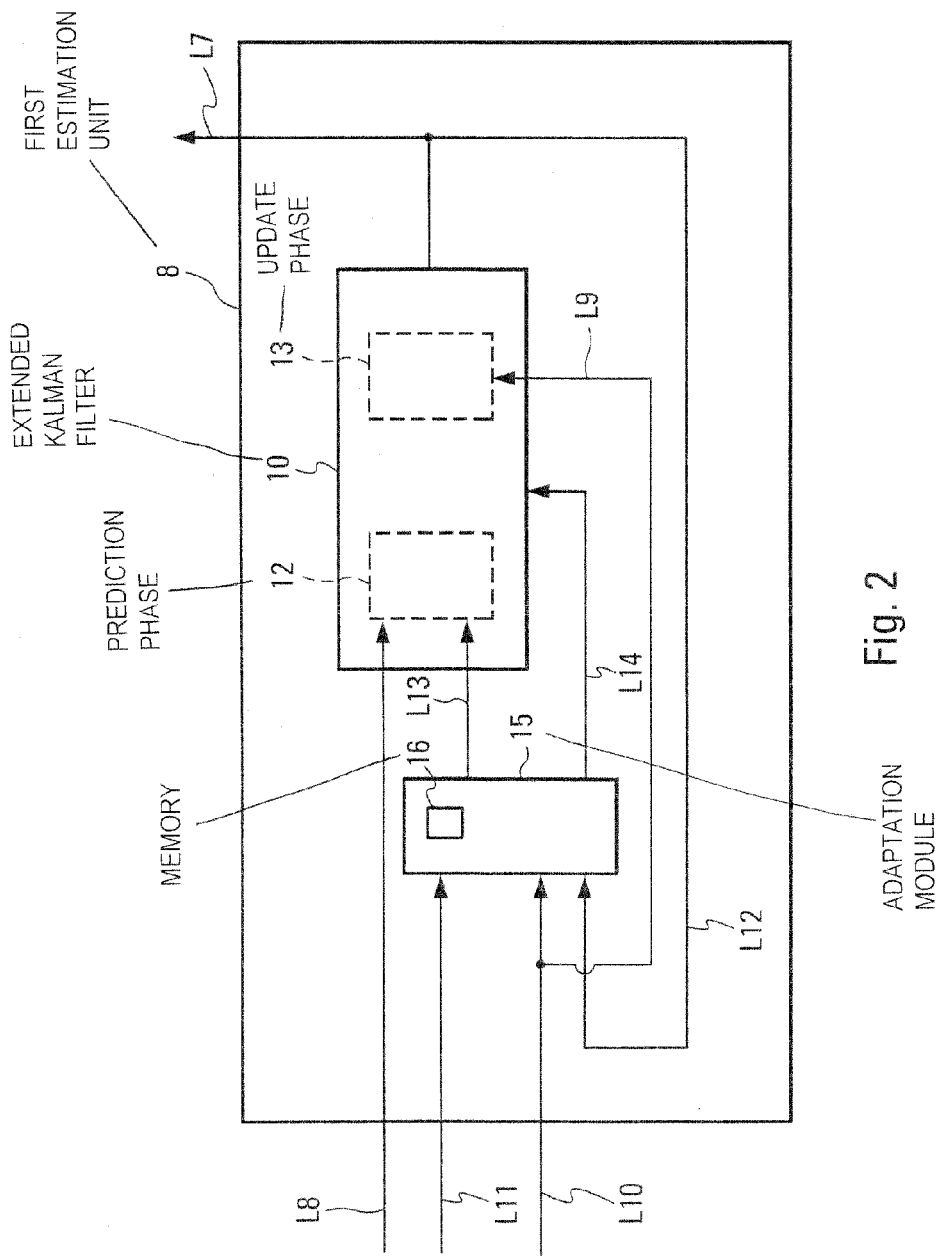
FIG. 2 is the schematic diagram of an estimation unit of the system for determining flight parameters of FIG. 1.

As shown by FIG. 2, the estimation unit 8 comprises an extended Kalman filter 10, with which are associated a state vector $X(t)$, the measurement vector $Z(t)$ and a control vector $U(t)$. The Kalman filter 10 is defined by the following equations:

$$\begin{cases} \dot{X}(t) = F(X(t), U(t)) + W(t) & \text{(State equation)} \\ Z(t) = H(X(t), U(t)) + V(t) & \text{(Measurement equation)} \end{cases}$$

in which:
F is the state matrix;
H is the matrix associated with the measurement noise;
$W(t)$ is the evolution noise vector;
$V(t)$ is the measurement noise vector; and
the notation "●" designates the derivative with respect to time.

In the exemplary embodiment of the Kalman filter 10, the state vector $X(t)$ is defined by the following twelve flight parameters:
the angle of incidence $\alpha$;
the speed $v$ of the aircraft in the terrestrial frame (x,y,z);
the speed V of the aircraft relative to the ground;
the pitch rate q;
the longitudinal attitude $\theta$;
the altitude h;
the net motive thrust $T_B$;
the bias $b_{nx}$ projected in the direction corresponding to the longitudinal acceleration nx;
the bias $b_{ny}$ projected in the direction corresponding to the lateral acceleration ny;
the wind speed $W_x$ along the x axis of the terrestrial frame (x,y,z);
the wind speed $W_y$ along the y axis of the terrestrial frame (x,y,z); and
the wind speed $W_z$ along the z axis of the terrestrial frame (x,y,z).

The measurement vector $Z(t)$ is, for its part, defined by the following nine flight parameters:
the aerodynamic angle of incidence $\alpha_a$;
the aerodynamic angle of sideslip $\beta_a$;
the speed of the air $V_a$;
the pitch rate q;
the longitudinal attitude $\theta$;
the altitude h;
the vertical speed $V_z$;
the normal load factor Nz;
the speed V of the aircraft relative to the ground.

According to the invention, the flight parameters, which define the measurement vector $Z(t)$, are chosen because they are inter-related by way of specially identified flight mechanics equations. The identified flight mechanics equations thus make it possible to establish a dependency relationship between the various chosen flight parameters forming the measurement vector Z(t).

The extended Kalman filter 10 is configured on the basis of the identified flight mechanics equations associated with the selected flight parameters forming the measurement vector Z(t). An initial parametrization of the filter 10 is also performed.

Furthermore, the control vector U(t) is formed by the following sixteen flight parameters:

the roll rate p;

the pitch rate q;

the yaw rate r;

the angle of roll φ;

the attitude θ;

the longitudinal acceleration nx;

the lateral acceleration ny;

the angle of incidence α;

the angle of sideslip β;

the speed of the air $V_a$;

the mass M of the aircraft;

the inertia Iyy;

the lifting force FZa;

the pitch moment $M_a$;

the real net static motive thrust $T_{BS}$;

the moment due to the net motive thrust $M_{TB}$.

The set of values of the parameters of the measurement vector Z(t) and of the control vector U(t) define the inputs of the extended Kalman filter 10.

The determination system 3 comprises a first module 11 for selecting, from among the measured values originating from the information unit 4 that it has received through the link L5, those which will form the inputs of the estimation unit 8, and in particular of the extended Kalman filter 10. Stated otherwise, the first selection module 11 delivers, as output, the selected measured values of the input parameters. The first selection module 11 delivers the measured values of the control vector U(t) directly to the extended Kalman filter 10, by way of the link L8.

Such as illustrated in FIG. 2, the operation of the Kalman filter 10 exhibits two distinct phases, namely:

a prediction phase (represented, in a symbolic manner, by the block 12), in the course of which the estimations $\hat{X}(t)$ and $\hat{Z}(t)$ are obtained; and an update phase (represented, in a symbolic manner, by the block 13), in which the measured values of the parameters forming the measurement vector Z(t)—received through the link L9—are used to correct the estimations $\hat{X}(t)$ and $\hat{Z}(t)$ delivered during the estimation phase (block 12).

According to the invention, the extended Kalman filter 10 is formed so as to deliver in real time, during a flight of said aircraft, joint estimations of the selected flight parameters forming the measurement vector Z(t) (such as for example the aerodynamic angle of incidence $\alpha_a$ and the air speed Va).

In the exemplary embodiment considered, the extended Kalman filter 10 is defined by the following equations:

$$\overset{*}{X} = \begin{cases} \dfrac{\overset{*}{\alpha} = q + \cos\alpha(FZ_\alpha - \sin\alpha_{\alpha_m}T_\beta)}{mV\cos\alpha_{\alpha_m}\cos\beta) - \tan\beta(p_m\cos\alpha - r_m\sin\alpha)} \\ \dfrac{\ldots + g\cos\alpha((\tan\alpha - \tan\alpha_{\alpha_m})nx_m + \tan\alpha\sin\theta + \cos\theta\cos\varphi_m)}{(V\cos\beta)} \\ \overset{*}{v} = V\cos\beta(p_m\sin\alpha - r_m\cos\alpha) - g(ny_m + b_{ny} - \cos\theta\sin\varphi_m) \\ \dfrac{\overset{*}{V} = \sin\alpha\cos\beta(FZ_\alpha - \sin\alpha_{\alpha_m}T_\beta)}{(m\cos\alpha_{\alpha_m}) + V\sin\beta} \\ \left(\dfrac{\overset{*}{v}}{V + r_m\cos\alpha\cos\beta\ldots - p_m\sin\alpha\sin\beta}\right) - \\ g\cos\beta((\cos\alpha - \tan\alpha_{\alpha_m}\sin\alpha)(nx_m + b_{nx}) + \\ \cos\alpha\sin\theta - \sin\alpha\cos\theta\cos\varphi_m) \\ \overset{*}{q} = \dfrac{(M_\alpha + M_{T_\beta} - mgz_{cg}nx_m)}{I_{yy}} \\ \overset{*}{\theta} = q\cos\varphi_m - r_m\sin\varphi_m \\ \overset{*}{h} = Vz = V(\cos\alpha\cos\beta\sin\theta - \sin\beta\cos\theta\sin\varphi_m - \\ \sin\alpha\cos\beta\cos\theta\cos\varphi_m) \\ \overset{*}{T}_\beta = -\omega_{T_\beta}(T_\beta - T_{\beta S}) \\ \overset{*}{b}_{nx} = \overset{*}{b}_{ny} = \overset{*}{W}_x = \overset{*}{W}_y = \overset{*}{W}_z = 0 \end{cases}$$

and $$Z = \begin{cases} \alpha_a = \tan^{-1}\left(\dfrac{w_a}{u_a}\right) \\ V_a = \|\vec{V}_a\| \\ \beta_a = \tan^{-1}\left(\dfrac{v_a}{(u_a^2 + w_a^2)^{0.5}}\right) \\ q = q_m \\ \theta = \theta_m \\ h = h_m \\ Vz = Vz \\ nz = \left(\left[\tan\alpha_{\alpha_m}\left(\dfrac{T_\beta}{mg + nx_m}\right) - \dfrac{FZ_\alpha}{mg\cos\alpha_{\alpha_m}}\right]\|\vec{V}\|\right)^T + \omega(t) \\ V = \|\vec{V}\| \end{cases}$$

in which:

the index m indicates a measured value of the corresponding parameter;

(u,v,w) are respectively the speeds in the terrestrial frame (x,y,z), such that:

$$\begin{cases} u = V\cos\alpha\cos\beta \\ v = V\sin\beta \\ w = V\sin\alpha\cos\beta \end{cases}$$

$(u_a,v_a,w_a)$ are respectively the air speeds in the terrestrial frame (x,y,z), such that:

$$\begin{cases} u_a = u - \cos\theta\cos\psi_m W_x - \cos\theta\sin\psi_m W_y + \sin\theta \cdot W_z \\ v_a = v - (\sin\theta\sin\varphi_m\cos\psi_m - \cos\varphi_m\sin\psi_m)W_x - \\ \quad (\sin\theta\sin\varphi_m\sin\psi_m + \cos\varphi_m\cos\psi_m)W_y \ldots - \\ \quad \cos\theta\sin\varphi_m W_z \\ w_a = w - (\sin\theta\cos\varphi_m\cos\psi_m + \sin\varphi_m\sin\psi_m)W_x - \\ \quad (\sin\theta\sin\varphi_m\sin\psi_m - \sin\varphi_m\cos\psi_m)W_y \ldots - \\ \quad \cos\theta\cos\varphi_m W_z \end{cases}$$

The determination system 3 also comprises a first verification module 14 which receives, as input, the measured values of the parameters of the measurement vector Z(t), so as to verify whether the measured values received are admissible, as a function of given admissibility criteria, or, conversely, are considered defective (for example because they are erroneous or inconsistent). The first verification module 14 is, for example, formed of comparators and of voters (not represented in FIG. 2). It is able to deliver, as output, a signal in which the defective measured values are logged.

Although, in the present example, the first selection 11 and verification 14 modules are located outside the estimation unit 8, they could, as a variant, be integrated with the unit 8.

Moreover, the estimation unit 8 comprises a module 15 for adapting the parametrization of the extended Kalman filter 10 which receives, as input, the measured values selected by the first selection module 11, the output signal of the first verification module 14 and the estimation $\hat{Z}(t)$ of the measurement vector Z(t) delivered as output by the filter 10, by way respectively of the links L10, L11 and L12.

In the case of detection, by the first verification module 14, of one or more defective measured values of the measurement vector Z(t) the adaptation module 15 delivers, as output through the link L13, the estimated values corresponding to the defective measured values—delivered by the Kalman filter 10—as well as the measured values of the measurement vector Z(t) that are admissible. The defective measured values are therefore substituted by the corresponding estimated values as input to the extended Kalman filter 10. Of course, as soon as the defective measured value becomes admissible again, the adaptation module 15 can deliver the new measured value, substituting it for the corresponding estimated value.

Moreover, the extended Kalman filter 10 is defined by the following matrices:
the covariance matrix R related to the measurement noise and associated with the diagonal matrix of the measurement noise V; and
the covariance matrix Q related to the evolution noise and associated with the diagonal matrix of the evolution noise W.

The covariance matrix R related to the measurement noise is defined by the relation $R=E[V(t)V(t)^T]$, where E designates the mathematical expectation. In a similar manner, the covariance matrix Q related to the evolution noise is defined by the relation $Q=E[W(t)W(t)^T]$. The matrices R and Q convey the confidence placed respectively in the measurements originating from the information unit 4 and in the estimation delivered by the extended Kalman filter 10.

Thus, in the case of detection, by the first verification module 14, of a defect of one or more measured values of the measurement vector Z(r), the adaptation module 15 is able to adapt, in real time, the current value of the covariance matrices R and Q, associated with the filter 10.

It should be noted that, upon the appearance of a fault in the measurements, a high value is fixed on the row or rows of the matrix R that are impacted by the defect and a low value is fixed on the row or rows of the matrix Q that are impacted by the defect. Indeed, a high value of the matrix R signifies that more confidence is placed in the measurements reaching the Kalman filter 10, so that extra confidence is accorded to the estimation.

Furthermore, the adaptation module 15 comprises a memory 16 in which are saved presetting pairs for the covariance matrices R and Q. In the exemplary embodiment, each presetting pair is associated with a predefined defective measured value of the measurement vector Z(t). Each presetting pair can allow selective adaptation of the covariance matrices R and Q by adjusting, for example, solely those coefficients of these matrices on which the defective measured value impinges, by way of the link L14.

In the exemplary embodiment, the two covariance matrices R and Q are adapted simultaneously. Of course, as a variant, it would be possible to envisage adapting solely the matrix R, or solely the matrix Q.

It should be noted that the matrices Q and R are initialized by predefined values, during the initial parametrization of the extended Kalman filter 10.

Moreover, the determination system 3 comprises:
a second module 17 for selecting, from among the measured values of the flight parameters, received from the information unit 4 (link L6), those for which the corresponding flight parameters are estimated by the extended Kalman filter 10 (this therefore entails the parameters forming the measurement vector Z(t)); and
a second verification module 18 which receives, as input through the link L15, the measured values selected by the second selection module 17. The second verification module 18, for example formed of comparators and of voters, is able to verify whether the measured values received are admissible, as a function of given admissibility criteria, or, conversely, are considered defective (for example because they are erroneous or inconsistent). In the case of detection of a defect of at least one of the selected measured values, the second detection module 18 is able to deliver, as output, a signal in which the defective measured value or values are logged.

Although, in the present example, the second selection module 17 and verification module 18 are located outside the determination unit 9, they could, as a variant, be integrated with the unit 9.

Moreover, in a variant, the first and second selection modules 11 and 17 could form just a single selection module. Likewise, the first and second verification modules 14 and 18 could, as a variant, be integrated with one another to form just a single verification module.

The determination unit 9 furthermore comprises a module 19 for determining the current values of the flight parameters forming the measurement vector Z(t), which receives the measured values selected by the second selection module 17, the defect signal delivered by the second verification module 18 and the estimation $\{\hat{Z}\}(t)$ of the measurement vector Z(t), delivered by the estimation unit 8, by way of the links L16, L17 and L7. Thus, for a considered flight parameter of the measurement vector Z(t), in the case of defect of at least one measured value associated with said flight parameter considered, the module 19 is able to determine the current value of said flight parameter considered, on the basis of the non-defective remaining selected values associated with this flight parameter and of the estimation of said flight parameter considered, and to deliver it, as output, to the automatic pilot 5 and to the manual piloting means 6, through the links L2 and L3. Accordingly, the determination module 19 can also implement comparators and/or voters.

Thus, by virtue of the invention, even in the case of total unavailability of measured values associated with one of the flight parameters forming the measurement vector Z(t), a current value, corresponding to the value estimated of said parameter by the estimation unit 8, can nevertheless be delivered to the automatic pilot 5 or to the manual piloting means 6, so that they are not deprived of input value.

Moreover, although the system for determining flight parameters in accordance with the invention has been described with reference to a control chain for an aerodynamic control surface, such a system could equally well be integrated in other control chains, for example a control chain for the speed of the engines.

The invention claimed is:

1. A method for improving real-time determination of flight parameters of an aircraft during flight, said method comprising the steps of:
    delivering, by a selection module, measured values of input parameters for estimating at least two selected flight parameters of said aircraft to an estimation unit; and
    estimating the selected flight parameters by the estimation unit,
    wherein the estimation unit is comprised of an extended Kalman filter that is configured to:
        identify flight mechanics equations which are associated respectively with the selected flight parameters and for which there exists a dependency relationship between said selected flight parameters;
        receive the values of the input parameters on the basis of said identified flight mechanics equations associated with said selected parameters; and
        during the flight of said aircraft, delivering, as output, joint estimations of said selected flight parameters in which the joint estimations are determined from the flight mechanics equations.

2. The method as claimed in claim 1, wherein:
    said Kalman filter is further configured to determine the joint estimations according to the following matrices:
        a covariance matrix R related to measurement noise and associated with a diagonal matrix of the measurement noise; and
        a covariance matrix Q related to evolution noise and associated with a diagonal matrix of the evolution noise,
    and the following method steps are further performed:
        verifying, by a verifying unit, whether the values of said input parameters received by the extended Kalman filter are admissible; and
        adapting, by an adaptation module, in a case in which a defect of a value of an input parameter is detected by the verifying unit, a current value of at least one of the covariance matrices R and Q, in real time.

3. The method as claimed in claim 2, wherein:
    in a preliminary step, a plurality of presettings of the covariance matrices R and Q related respectively to the measurement and evolution noise is defined, by the extended Kalman filter, with said plurality of presettings thus defined each being associated with a defective value of one of said input parameters; and
    the current value of the at least one of said covariance matrices Q and R is adapted by the adaptation module upon detection of a defect of the value of an input parameter, and the at least one of the plurality of presettings corresponding to the detected defective value is assigned to at least one of the covariance matrices R and Q.

4. The method as claimed in claim 2, wherein, in the case of detection of a defect of a value of one of said input parameters measured by one or more sensors embedded aboard said aircraft, said defective measured value is substituted by an estimated corresponding value delivered as output of said extended Kalman filter.

5. The method as claimed in claim 1, wherein, the following step is performed upon detection of a defect of at least one value of the input parameter:
    determining, by a flight parameter determination module, a current value for the detected defect value, wherein the determination is based on non-defective values of the selected flight parameter and on the estimation of said selected flight parameters by the estimation unit, while excluding the detected defect value.

6. The method as claimed in claim 1, wherein said extended Kalman filter is comprised of a control vector defined by the following twelve states:
    angle of incidence $\alpha$;
    speed in a terrestrial frame v;
    ground speed ground V;
    pitch rate q;
    attitude $\theta$;
    altitude h;
    net motive thrust $T_B$;
    bias $b_{nx}$ projected in the direction corresponding to longitudinal acceleration nx;
    bias $b_{ny}$ projected in the direction corresponding to lateral acceleration ny;
    wind speed $W_x$ along the x axis of the terrestrial frame;
    wind speed $W_y$ along the y axis of the terrestrial frame; and
    wind speed $W_z$ along the z axis of the terrestrial frame.

7. The method as claimed in claim 1, wherein said input parameters of the extended Kalman filter comprise inertial parameters, anemometric parameters, parameters specific to said aircraft and intermediate parameters arising from onboard modelings.

8. A system for determining, in real time, flight parameters of an aircraft, in the course of a flight of the latter, which comprises an extended Kalman filter able to receive values of input parameters, wherein
    said extended Kalman filter is configured on the basis of flight mechanics equations establishing a dependency relationship between at least two preselected flight parameters of said aircraft to be estimated belonging to said input parameters; and
    said extended Kalman filter is formed so as to deliver, during a flight of said aircraft, joint estimations of said selected flight parameters.

9. The system as claimed in claim 8, wherein:
    said Kalman filter is defined by the following matrices:
        the covariance matrix R related to the measurement noise and associated with the diagonal matrix of the measurement noise V; and
        the covariance matrix Q related to the evolution noise and associated with the diagonal matrix of the evolution noise W, and said system comprises:
- means for verifying whether the values of said input parameters of the extended Kalman filter are admissible; and
- means for adapting in real time, in the case of detection, by said verification means, of a defect of a value of an input parameter, the current value of at least one of the covariance matrices R and Q.

10. The system as claimed in claim 9,
which furthermore comprises means for replacing the defective value or values by their value estimated by the extended Kalman filter, when they are available.

11. An aircraft,
which comprises at least one system such as specified under claim 8.

* * * * *